United States Patent

[11] 3,558,815

[72] Inventor Arthur J. Banks
Cherry Hill, N.J.
[21] Appl. No. 717,625
[22] Filed Apr. 1, 1968
[45] Patented Jan. 26, 1971
[73] Assignee RCA Corporation
a corporation of Delaware

[54] VIDEO SIGNAL SWITCHING STEP SUPPRESSOR
5 Claims, 8 Drawing Figs.

[52] U.S. Cl. 178/7.1
178/6
[51] Int. Cl. H04n 5/18
[50] Field of Search 178/6F&M,
5.4, 7.1, 5.8

[56] References Cited
UNITED STATES PATENTS 2,697,746 12/1954 Kennedy 178/5.8
2,808,455 10/1957 Moore 178/6(F&M)
2,964,589 12/1960 Walker 178/6(F&M)

*Primary Examiner*—Richard Murray
*Assistant Examiner*—Richard P. Lange
*Attorney*—Eugene M. Whitacre

ABSTRACT: The video signal switcher has an input which is switched from a first to a second source of video signal and an output which is coupled by a capacitor to utilization means. The output terminal of the capacitor is clamped to a reference potential during a period when both video signals are at blanking level. Following the initiation of, and during, the clamping period the input of the switcher is transferred from the first to the second video signal source so that the capacitor receives a charge corresponding to any difference between the blanking level potential of the second video signal and the reference potential. In one embodiment, the reference potential corresponds to the blanking level potential of the first video signal. In a second embodiment, the reference potential is ground and the coupling circuit between the clamping means and the utilization means includes boosting means for the low frequency video signals. In a third embodiment, a negative feedback is provided from the output of the low frequency boosting means to the input of the video signal switcher.

INVENTOR
ARTHUR J. BANKS
BY Eugene M. Whitacre
ATTORNEY

INVENTOR
ARTHUR J. BANKS
BY Eugene M. Whitacre
ATTORNEY

INVENTOR
ARTHUR J. BANKS
BY Eugene M. Whitacre
ATTORNEY

VIDEO SIGNAL SWITCHING STEP SUPPRESSOR

BACKGROUND OF THE INVENTION

In the course of a television program it is the practice to switch frequently from one AC coupled video signal to another. One example of such practice is a switch from the program to a commercial presentation. The video signal from each source has its own average picture level (APL). These may vary from one extreme (all-white) to the other (all-black). For example, if he the switch is made from a video signal representing a beach scene in bright sunlight (mostly white) to a video signal representing a commercial presentation of a few white indicia on a black background (mostly black), there is a wide variation in the respective average picture levels. This means that, on an alternating current basis, the respective blanking levels of such signals vary markedly. A direct switch between two such video signal sources produces an abrupt change or step in the blanking level of the resultant signal. The magnitude of the blanking level change is greatest in the case of a switch between an all-white video signal and an all-black video signal. Switches between video signals of intermediate APL's produce blanking level changes of lesser magnitudes.

The abrupt changes in the blanking level of the video signal resulting from such a direct switching operation would prevent the proper functioning of the DC restorer apparatus included in the signal processing circuits following the switcher. The DC restorers serve a number of useful purposes other than to maintain the blanking level of the video signal at the cutoff potential of a picture reproducing tube. One such other purpose is to limit the dynamic range requirements of the signal amplifying and processing stages. Another, and perhaps the most important, purpose of DC restoration is to establish a signal blanking level at a relatively stable reference potential in order to facilitate sync signal separation. Any abrupt change in the blanking level of the video signal also produces a similar change in the sync signal relative to the reference potential, thereby causing a distortion or loss os sync information.

In the past, one general practice has been to effect DC restoration of all video signals before the performance of the switching operation. This practice requires a DC restorer at each input of the switcher. Not only does such a practice require the use of a relatively large number of DC restorers, because there usually are more inputs to the switcher than outputs, but also it has the disadvantage that a DC restorer frequently imparts some distortion to the video signal. There also is redundancy in such a system in that the DC restoration occurs continuously at all switcher inputs, whereas it is required only immediately prior to a switching operation and then only at the two video signal inputs between which the switch is to be made.

In the video signal switcher embodying the present invention the output terminal of a capacitor coupling the switcher output to utilization means is clamped for a period of time to a reference potential, the time period beginning while both the old and new video signals are at their respective blanking levels. During the clamping period the input of the switch is transferred to the new video signal, the blanking level potential of which is impressed upon the input terminal of the coupling capacitor, which becomes charged by the difference, if any, between the blanking level potential of the new video signal and the reference potential. In one embodiment of the invention, the reference potential corresponds to the blanking level potential of the old video signal, which is derived by measuring that potential at the output terminal of the coupling capacitor and transferring it to a storage device to which the reference terminal of the clamp is connected. In a second embodiment, the potential measuring and storage means are eliminated, and the reference potential to which the clamp is connected is ground. Because of the small time constant of the coupling circuit needed for the successful operation of this second embodiment, such circuit effectively constitutes a high pass filter which discriminates against low-frequency video signals. Hence, the second embodiment includes a low-frequency boosting means in the signal path following the clamping means. A refinement of this second arrangement comprises a third embodiment which is a closed-loop system including the effective high pass filter of the coupling circuit, the clamping means, the low-frequency boosting means in the forward path and a negative feedback from the output of the low-frequency boosting means to the input of the switching step suppressor. The negative feedback serves to compensate for the possible time constant mismatch of the effective high pass filter and the low-frequency boosting circuit.

For a more detailed disclosure of the invention, reference may be had to the following description which is given in conjunction with the accompanying drawings, of which:

The following description is given on the assumption that the video signal switches or transfers are made between video signals that are composite (i.e., include horizontal and vertical blanking and sync signals) and synchronous, and that the switching is done during the vertical blanking intervals, while both the old and the new video signals are at their respective blanking levels. These are reasonable conditions because they prevail in the operation of the switchers now commonly used. Also, the description will deal with the transfer from an all-white signal to an all-black signal. It will be understood that the switcher embodying the present invention operates equally well for a black-to-white signal transfer.

Figure 1:
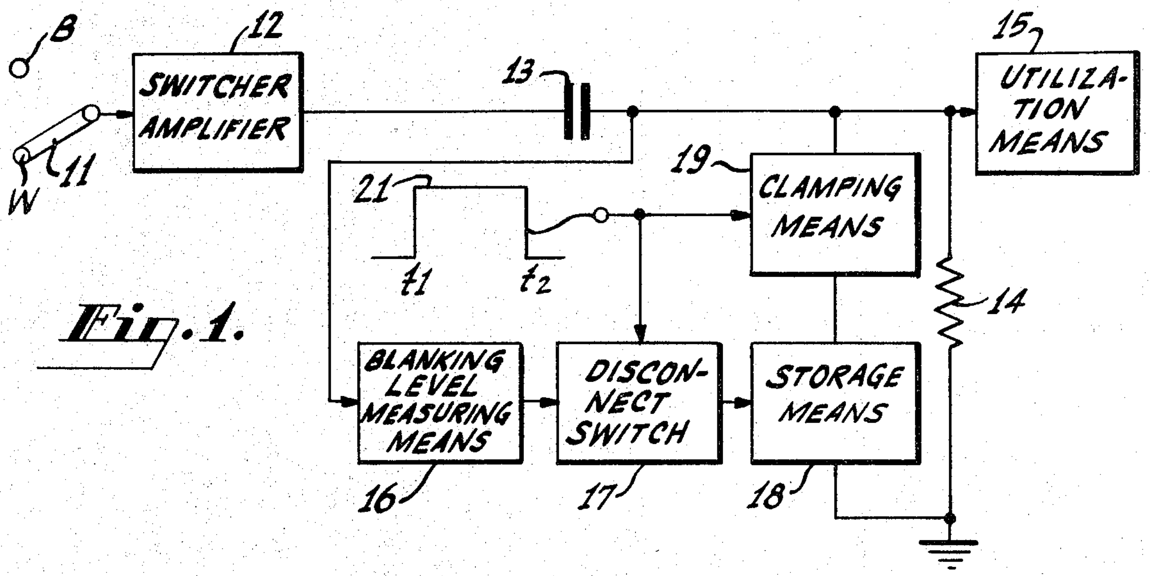
FIG. 1 is a block diagram of one embodiment of the improved video signal switcher of the invention.

In FIG. 1 the switch 11 is shown connecting its W input terminal, at which an all-white video signal is present, to a switcher amplifier 12. Operation of the switch 11 to its B input terminal impresses an all-black video signal upon the input of the amplifier 12. The output of the amplifier 12 is coupled by means including a series-connected capacitor 13 and a shunt-connected resistor 14 to a utilization means 15 by which the video signals are further processed. A blanking level measuring means 16 connected to the output of the capacitor 13 produces a voltage which is continuously representative of the blanking level potential of the video signal produced in the output of the amplifier. This blanking level representative voltage is applied by a normally closed disconnect switch 16 17 to a storage means 18. Storage means 18 may be a capacitor having one terminal coupled to disconnect switch 17 and clamping means 19 and a second terminal coupled to ground. A keyed clamping means 19, which is connected between the output terminal of the coupling capacitor 13 and the storage means 18, connects the capacitor output terminal to the storage means when activated by a pulse 21 which occurs at a time when the video signals at the W and B terminals of the switch 11 are at their respective blanking level potentials. No immediate change occurs because both input and output terminals of the capacitor are at essentially the same potential, viz., that representative of the blanking level of the all-white signal. The pulse 21 also activates the disconnect switch 17 to disconnect the blanking level measuring means 16 from the storage means 18.

The switch 11 now is operated to its B input terminal to impress the all-black video signal upon the input of the amplifier 12. The coupling capacitor 13 now has its output terminal clamped at the blanking level potential of the all-white video signal, and its input terminal assumes the blanking level potential of the all-black video signal, as the capacitor becomes charged by the difference between these two potentials. The clamping means 19 and the disconnect switch 17 remain activated under the control of the pulse 21 for a sufficient time from $t1$ to $t2$ for the capacitor 13 to reach a steady-state condition. This time, which must expire before the occurrence of the next horizontal sync pulse and while the all-black signal is still at is its blanking level potential, is proportional to the time constant of the circuit including the capacitor 13 and the resistance of the output of the switcher amplifier 12 and the series resistance of the clamping means 19. Preferably, the output resistance of the switcher amplifier is relatively small, such as that present in an emitter-follower transistor amplifier, for example. Also, the series resistance of the clamping means is preferably small relative to the output resistance of the switcher amplifier. In the discussion which follows, the series resistance of the clamping means will be assumed zero unless otherwise stated.

Figure 2:
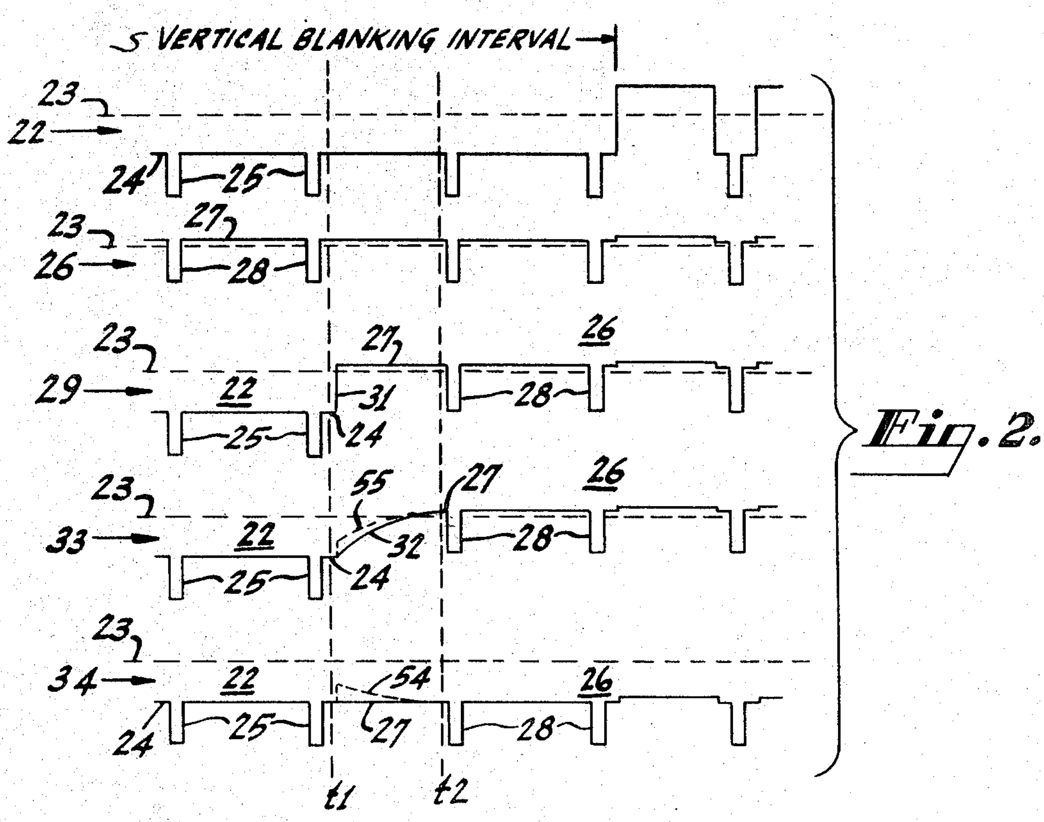
FIG. 2 is a group of waveforms representing the video signal voltages at different points of the switcher of FIG. 1.

In FIG. 2 the wave 22 represents an all-white composite video signal, the AC axis 23 of which is at ground potential. It has a blanking-level potential 24 and horizontal sync pulses 25. The last three lines of vertical blanking and the first white line of a field are shown in FIG. 2. The wave 26 represents an all-black composite video signal having the ground potential AC axis 23, a blanking level potential 27 and horizontal sync pulses 28. The wave 29 represents a combination of the all-white video signal 22 and the all-black video signal 26 and is the signal impressed upon the input of the switcher amplifier 12 of FIG. 1 when the switch 11 is operated from its W to its B input terminal. Note that, at this instant of the switch operation, an abrupt change or step 31 occurs between the blanking level potential 24 of the all-white video signal wave 22 and the blanking level potential 27 of the all-black video signal wave 26. This step also changes the sync pulses 28 of the all-black signal wave 26 relative to the ground potential AC axis 23. Such a condition would cause a malfunctioning of any DC restorer and the temporary nonfunctioning of any sync separator previously set to operate in response to the blanking level potential 24 and the sync pulses 25 of the all-white signal wave 22.

In the apparatus of FIG. 1 embodying the invention, however, the condition illustrated by the wave 29 of FIG. 2 exists only at the input of the switcher amplifier 12 and is not transferred to the utilization means 15. Instead, just prior to the operating of the switch 11 from its W to its B input terminal, the pulse 21 activates the clamping means 19 and the disconnect switch 17 to hold the output terminal of the coupling capacitor 13 at the blanking level potential 24 of the all-white signal as described. The switch 11 then is operated and the coupling capacitor is charged by the difference of potential between the all-white and the all-black blanking levels as indicated by the transition 32 of the wave 33 of FIG. 2 which represents the signal at the output of the amplifier 12 and at the input terminal of the capacitor 13. As a result of such charging of the coupling capacitor, steady-state conditions are established at $t2$, the termination of the pulse 21, and the blanking level potential 27 of the all-black video signal 26 corresponds to the blanking level potential 24 of the all-white video signal 22, as indicated in the wave 34, which is representative of the signal at the output terminal of the coupling capacitor 13 and which is transferred to the utilization means 15.

Figures 3, 5, 6, 7, 8:
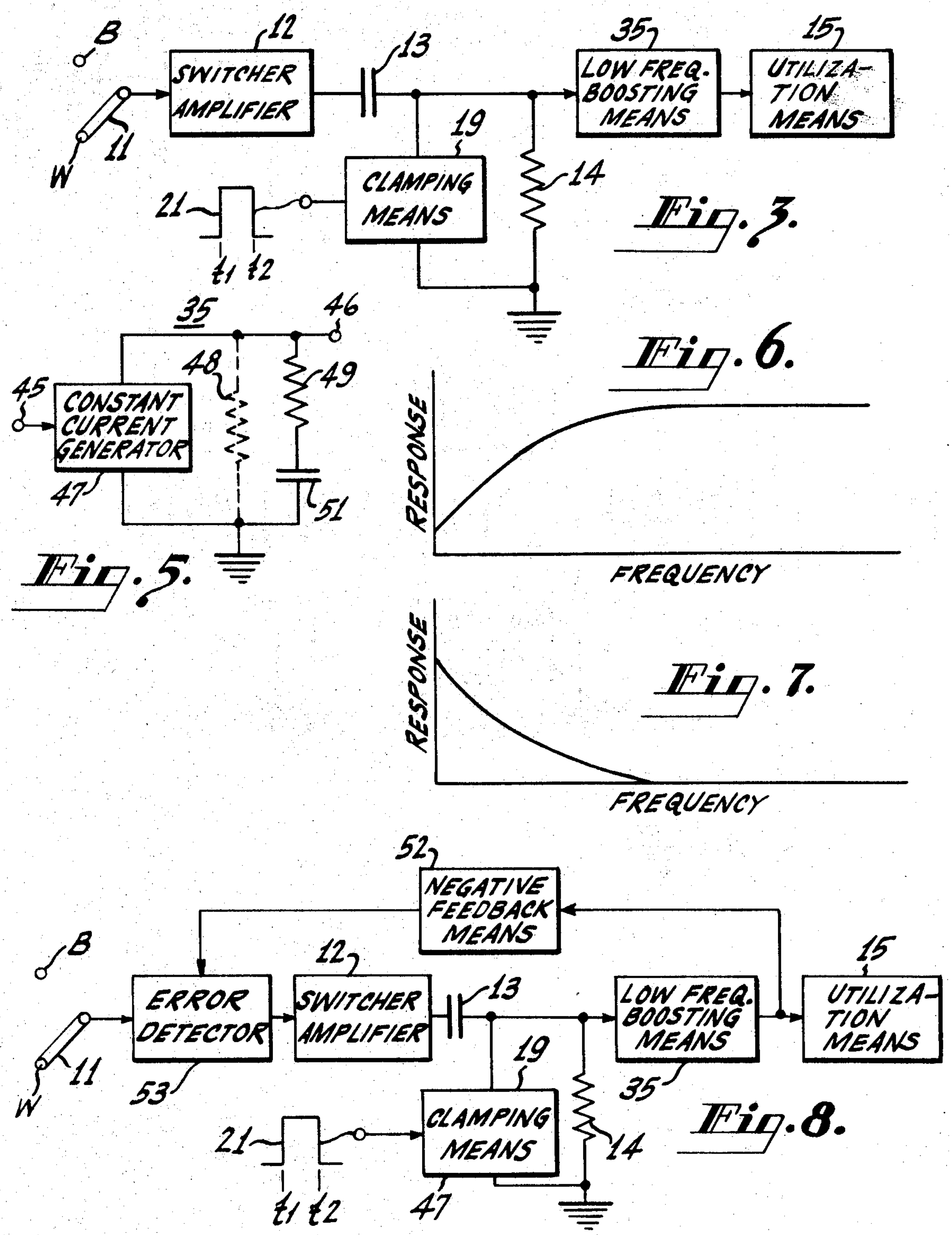
FIG. 3 is a block diagram of a simplified embodiment of the improved video signal switcher.
FIG. 5 is a partial schematic and block diagram of a low-frequency boosting means usable in the system of FIG. 3.
FIG. 6 is a curve representing the frequency response of the coupling and clamping circuits of FIG. 3.
FIG. 7 is a curve representing the frequency response of the low-frequency boosting means of FIG. 3.
FIG. 8 is a block diagram of a refinement of the switcher of FIG. 3.

In FIG. 3 a simplified form of the invention references to ground the clamping means 19, which otherwise is connected to the output terminal of the capacitor 13, which is included in the coupling between the output of the switcher amplifier 12 and the utilization means 15. In this case the coupling also includes a low-frequency boosting ma means 35, the purpose and functioning of which will presently be described. As indicated by the wave 36 of FIG. 4, which represents the video signal applied by the switch 11 to the input of the switcher amplifier 12, a switch is made from an all-white signal 37 having a blanking level potential 38 to an all-black signal 39 having a blanking level potential 40 between which an abrupt change or step 41 is produced. This switch is made late in the 21-line vertical blanking interval as, for example, between the 14th and 15th lines thereof. At such time, by making the time constant of the circuit including the coupling capacitor 13, the resistor 14 and the resistance of the output of the amplifier 12 sufficiently small, the blanking level potential 38*a* of the all-white signal at the output terminal of the capacitor will be substantially at the ground potential of the AC axis 20 as shown by the wave 42 of FIG. 4. The blanking level 38*a* of the all-white signal 37 is clamped there by the activation of the clamping means 19 under the control of the pulse 21 during the period 43 of FIG. 4. The blanking level change 41 of wave 36 does not appear in wave 42, because it serves to charge capacitor 13 to equilibrium while the output terminal thereof is clamped at ground potential.

Figure 4:
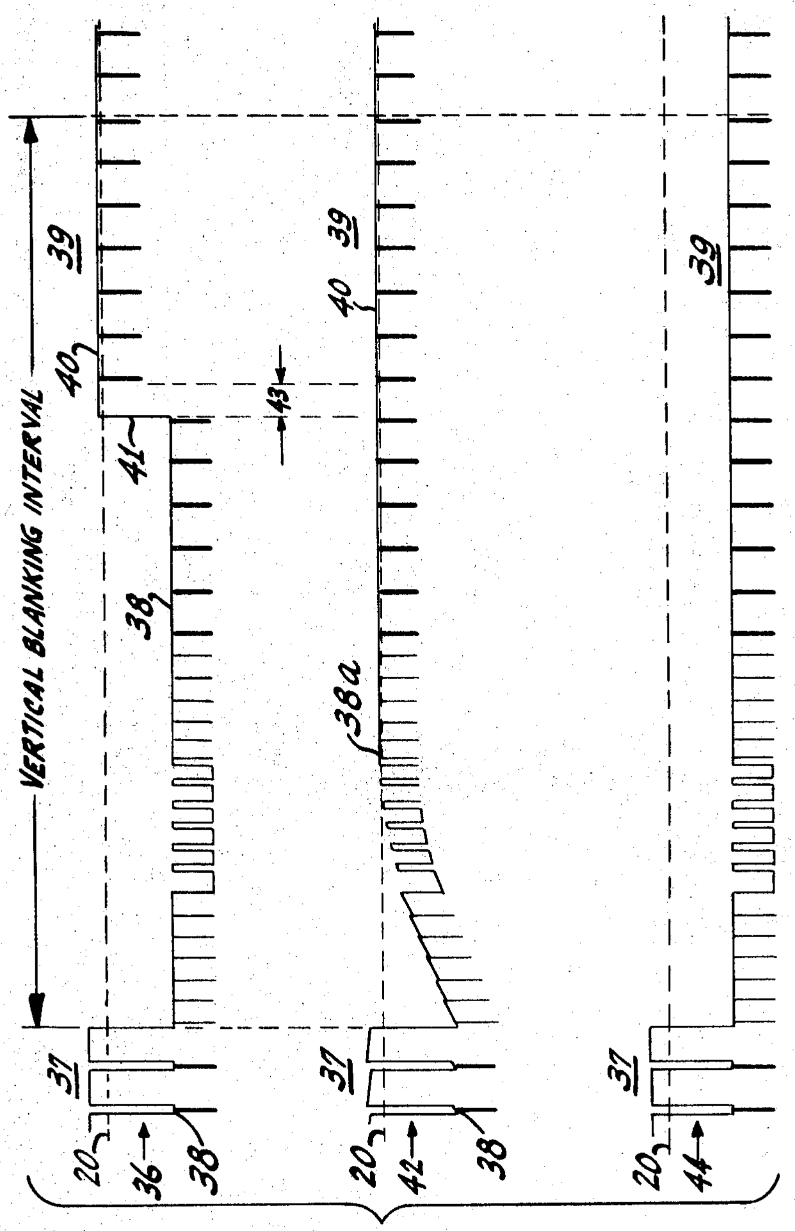
FIG. 4 is a group of waveforms representing the video signal voltages at different points of the switcher of FIG. 3.

By making the time constant of the circuit including the coupling capacitor 13 and the resistor 14 small enough to ensure that the blanking level of the all-white signal at the output terminal of the capacitor is substantially at ground potential at the time that the switch 11 is operated, the coupling circuit thereby effectively constitutes a high pass filter which discriminates against the low frequencies of the video signal. Hence, in the embodiment of the invention shown in FIG. 3, the low-frequency boosting means 35 is employed to compensate for such discrimination. The wave 44 of FIG. 4 illustrates the video signal derived from the output of the low-frequency boosting means which has effected such compensation, including the described switch from an all-white to an all-black signal from which any abrupt change in blanking levels is eliminated.

FIG. 5 illustrates one form of apparatus which may be employed as the low-frequency boosting means 35. The video signal derived from the coupling capacitor 13 of FIG. 3 and applied to the input terminal 45 of the network 35 of FIG. 5 has a frequency response as shown by the curve of FIG. 6. The compensatory frequency response of the low-frequency boosting network 35 of FIG. 5 is shown by the curve of FIG. 7 so that the response of the overall system from input of switcher amplifier 12 to output of the boosting network 35 is substantially uniform over the entire frequency range. The circuit elements shown in solid lines in FIG. 5 represent an AC type of network. If, in practice, the constant current generator 47 is the collector electrode of a transistor, for example, a DC source must be connected to such electrode. This has the effect of a resistor 48, shown in broken lines, connected in shunt with the series arrangement of the resistor 49 and the capacitor 51 of the network. The effect of such a resistor 48 is to put an upper limit or plateau on the amount of low-frequency boosting which may be achieved. In the use of such a network 35 in the switching system of FIG. 3, it must be so designed that the limit or plateau is sufficiently high to ensure adequate low-frequency response in the overall system.

In the embodiment of the invention shown in FIG. 3 there is a practical problem in effecting a proper match between the low-frequency boosting means 35 and the effective high pass filter constituted by the coupling circuit including the series capacitor 13 and the shunt resistor 14. A proper match is necessary to achieve a flat frequency response throughout the entire video signal band, Such a difficulty is alleviated by the refinement of the system shown in FIG. 8. Negative feedback means 52 is connected from the output of the low-frequency boosting means 35 to an error detector 53 which is coupled between the switch 11 and the input of the switcher amplifier 12. A closed loop thus is formed which includes in its forward path the effective high pass filter of the coupling circuit and the low-frequency boosting means. The closure of this loop through the negative feedback means 52 tends to flatten the overall frequency response of the switching system in spite of the mismatch between the high pass and low-frequency boosting circuits. When the low-frequency boosting means comprises the network 35 of FIG. 5 and the constant current generator 47 thereof is a DC type, the shunt resistor 48 has the effect of causing a voltage to exist across the clamping means 19 of FIG. 8 at the beginning *t* of the clamp pulse 21. The resistor 48, therefore, must be large enough to ensure that this voltage is negligibly small.

From the foregoing description of a number of switching systems embodying the present invention it is seen that they all employ the principle of effectively charging the coupling capacitor 13 by the difference in potential between the respective blanking levels of the two video signals involved in the switching operation, thereby suppressing any switching step. In the system of FIG. 1, the blanking level potential of one video signal is measured and stored so that the difference between it and the blanking level potential of the following video signal may charge the coupling capacitor 13. In the systems of FIGS. 3 and 8, the blanking level potential is constrained to reach a predetermined potential, ground in this instance, by the time that the transfer to a new signal is effected so that the difference between that potential, which has been made the reference potential for a clamp, and the blanking level potential of the following video signal may be made to charge the coupling capacitor 13. Also, in the systems of FIGS. 3 and 8 low-frequency compensation is provided for the frequency discrimination produced by the blanking level constraining means. Finally, the system of FIG. 8 is provided with negative feedback around a loop which includes the blanking level constraining means and the low-frequency compensating means in order to effect better control of the signal transfer characteristics of the system from its input to its output.

All of the embodiments of the invention suppress not only any abrupt change or step between the respective blanking level potentials of the video signals between which a switch is made, but also any transients which may result from the operation of the switch 11. Any such transients are integrated by the coupling capacitor 13 and are prevented from appearing in the output signal by the clamping means 19. Thus, "-cleanness" of the switching operation is not as critical as in other apparatus formerly used.

It should be pointed out as a practical matter that the clamping means 19 will have a finite resistance, not zero as assumed in the foregoing discussions. To the extent that this resistance is appreciable relative to the output resistance of the switcher amplifier 12, a transient will appear across the clamping means at the time a switch is made between video signals of different APL's. A typical resulting transient is illustrated by dashed line 54 in wave 34 of FIG. 2. The corresponding result at the input terminal of the coupling capacitor 13 is shown in wave 33 of FIG. 2 by dashed line 55. It is significant to note that while the transient 54 is a departure from the ideal condition of no sudden variation of blanking level, it is still possible to obtain recovery before the next horizontal sync pulse. Thus the essential objective of causing the blanking level just prior to a sync pulse to be the same as it was just prior to the preceeding sync pulse is still attainable.

I claim:

1. In a video signal switcher having an input which is switched from a first to a second source of video signal, the average picture levels of which may differ, apparatus for suppressing abrupt changes in the blanking level to the resultant video signal produced in the output of the switcher, said apparatus comprising:

utilization means for the resultant video signal;

a coupling capacitor having an input terminal coupled to said switcher output and an output terminal coupled to said utilization means;

storage means for storing a reference potential representative of the blanking level of said first video signal coupled to the output terminal of said coupling capacitor;

clamping means connected between said capacitor output terminal and said storage means;

means for activating said clamping means while both of said first and second video signals are at their respective blanking levels to hold said capacitor output terminal at said reference potential; and means operable for switching the input of said switcher from said first to said second source of video signal during said activation period of said clamping means to effect charging of said coupling capacitor to the difference between the blanking level potential of said second video signal and said reference potential.

2. Apparatus as defined in claim 1, and additionally including: blanking level measuring means coupled between the output terminal of said coupling capacitor and said storage means.

3. Apparatus as defined in claim 2, and additionally including:

a normally closed disconnect switch coupled between said blanking level measuring means and said storage means; and means for opening said disconnect switch during said activation period of said clamping means.

4. In a video signal switcher having an input which is switcher from a first to a second source of video signal, the average picture levels of which may differ, apparatus for suppressing abrupt changes in the blanking level of the resultant video signal produced in the output of the switcher, said apparatus comprising:

utilization means for the resultant video signal;

a coupling capacitor having an input terminal coupled to said switcher output and an output terminal coupled to said utilization means;

clamping means connected between said capacitor output terminal and a source of reference potential;

means for activating said clamping means while both of said first and second video signals are at their respective blanking levels to hold said capacitor output terminal at said reference potential;

means operable for switching the input of said switcher from said first to said second source of video signal during said activation period of said clamping means to effect charging of said coupling capacitor to the difference between the blanking level potential of said second video signal and said reference potential;

the time constant of the switcher output circuit including said coupling capacitor in combination with said video signal switcher output and said clamping means is sufficiently small that the blanking level of said second video signal is substantially at said reference potential when said input switching means is operated, said switcher output circuit thereby constituting a high pass filter which discriminates against low-frequency video signals; and low-frequency boosting means coupled between said switcher output circuit and said utilization means.

5. Apparatus as defined in claim 4, and additionally including: negative feedback means coupled between the output of said low-frequency boosting means and said video signal input to counteract the effect of any difference in time constants of said constituted high pass filter and said low-frequency boosting means, thereby effectively providing the apparatus with a substantially uniform response to all video signal frequencies.